May 7, 1940.  F. LAUCK  2,200,030
COURSE DEVICE FOR VEHICLES
Original Filed June 25, 1937
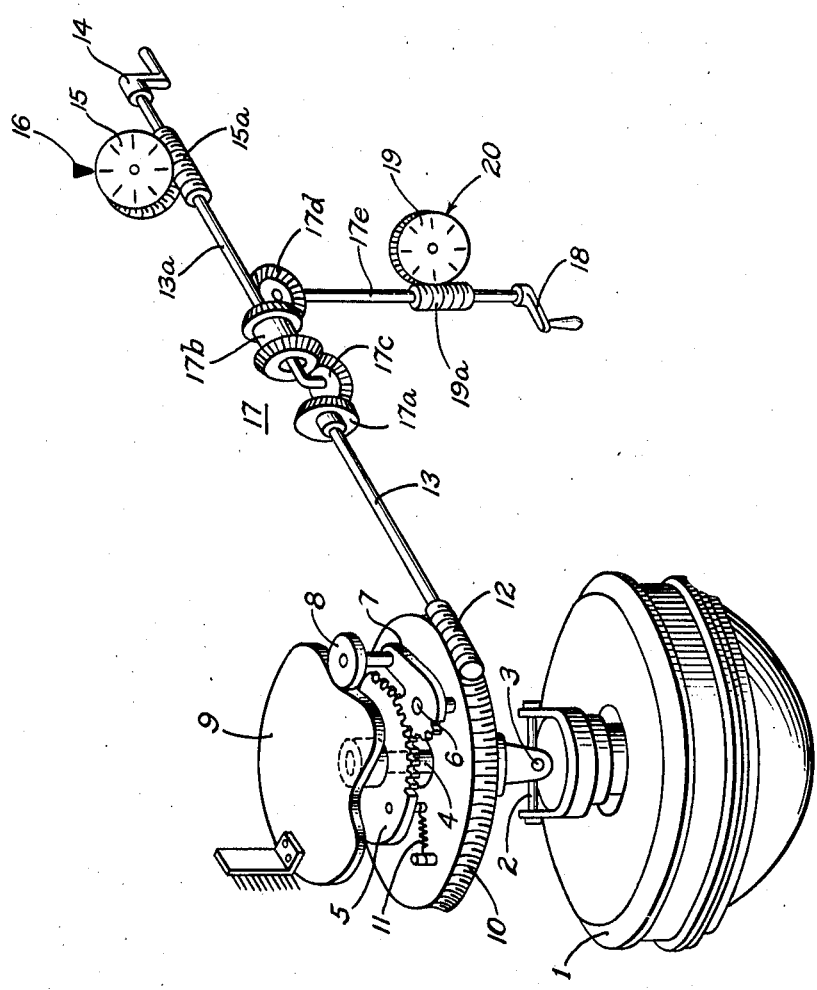
INVENTOR.
Friedrich Lauck
BY Stephen Cerstvik
ATTORNEY.

Patented May 7, 1940

2,200,030

UNITED STATES PATENT OFFICE 2,200,030

COURSE DEVICE FOR VEHICLES

Friedrich Lauck, Travemunde, Germany, assignor to Siemens Apparate und Maschinen Gesellschaft mit beschränkter Haftung, Berlin, Germany, a corporation of Germany Original application June 25, 1937, Serial No. 150,415. Divided and this application July 28, 1939, Serial No. 287,141. In Germany June 29, 1936

2 Claims. (Cl. 33—224)

This invention relates to course maintaining devices for vehicles such as aircraft and more particularly to devices of the above type which include means responsive to the earth's magnetic field and are adapted to indicate direction or to control the course of the vehicle, and is a division of applicant's copending application, Serial No. 150,415, filed June 25, 1937.

An object of the invention is to provide a device of the above type which is automatically corrected to compensate for the compass deviaion caused by the metallic parts of the vehicle itself.

Another object is to provide a device of the above type having means to correct the compass variation due to the known angular variation in the earth's magnetic field.

Other objects and advantages will be apparent as the nature of the invention is more fully disclosed.

Although the novel features which are believed to be characteristic of this invention will be particularly pointed out in the claims appended hereto, the invention itself may be better understood by referring to the following description, taken in connection with the accompanying drawing, in which one embodiment of the invention has been set forth for purposes of illustration.

In the drawing, the single figure is a perspective view, partly diagrammatic, illustrating a directional compass embodying the present invention.

Referring to the embodiment illustrated in the drawing, a compass is disclosed which may be of any standard type having a directional element responsive to the earth's magnetic field mounted in cooperative relation with a course member such as a compass card and which compass is suspended by links 2 and 3 from a shaft 4 in such manner that the compass remains horizontal at all times. A disc 5 is carried by the shaft 4 and is provided at its periphery with teeth which are engaged by a pinion 6, attached to a lever 7. The lever 7 carries a roller 8 engaging a cam disc 9 which is fixed with respect to the vehicle. The pinion 6 is carried on a worm wheel 10 which is coaxial with the shaft 4 and is coupled with the disc 5 by means of a spring 11 which is adapted to take up any slack or looseness between the disc 5 and the pinion 6 and to hold the roller 8 against the surface of the cam disc 9.

The worm wheel 10 is adjusted by means of a worm 12, carried by a shaft 13 and controlled by a crank 14 actuating a shaft 13a which is connected to the shaft 13 by means of a differential gear 17. The differential gear 17 comprises a disc 17a attached to the shaft 13 and a sleeve 17b engaging a pinion 17c carried by the shaft 13a. The sleeve 17b is actuated by a gear 17d carried by a shaft 17e which is controlled by a crank 18. A suitable scale 15 cooperating with an index mark 16 is actuated by a worm 15a carried by the shaft 13a to indicate the adjustment effected by the crank 14. A similar scale 19 cooperating with an index mark 20 is actuated by a worm 19a mounted on a shaft 17e to indicate the adjustment effected by the crank 18.

In the operation of the above-described device, the desired course is set by adjusting the course member by means of the crank 14 and the scale 15. This adjustment is effected by the unitary movement of the shafts 13 and 13a which, through the worm 12 and the worm wheel 10 and pinion 6 cause a corresponding movement of disc 5 thereby displacing the housing of the compass and setting the compass to the course desired. During this adjustment the roller 8 rolls around the surface of the cam disc 9 thereby causing the pinion 6 to rotate slightly and to vary the angular position of the disc 5 by an amount dependent upon the contour of the cam disc 9. The cam disc 9 is designed to compensate for the deviation caused by the vehicle itself, such as by the distribution of the magnetic masses which affect the accuracy of the compass. This cam disc 9 and associated mechanism accordingly automatically compensates for the compass deviation and eliminates this factor from consideration by the navigator.

The variation of the compass produced by the directional variation in the earth's magnetic field and which may be determined from charts or tables, is compensated for by means of the crank 18 and scale 19 which acts through differential gear 17 to make an adjustment of the worm wheel 10 similar to that above described.

With this device the course member is set to the desired angular position by means of the scale 15. Thereafter it is only necessary to make the necessary adjustment according to the scale 19 to compensate for the variation of the compass in the particular localities involved. Hence all metal calculations are eliminated and the accurate adjustment of the compass to the desired course is facilitated.

It will be noted that the system above described, provides an accurate means for automatically connecting the deviation of a compass needle without the introduction of magnetic masses or other correcting means which tend to distort the direction of the earth's field. Means is also provided so that the variation of the compass can be easily corrected by the navigator. In operation, it is only necessary to make two adjustments, namely, the course adjustment effected in accordance with scale 15 and the variation adjustment which is effected in accordance with the scale 19.

Although only one embodiment of the invention has been illustrated and described, it is to be specifically understood that various changes and modifications in form, materials and relative arrangement of parts, which will now appear to those skilled in the art, may be made without departing from the scope of the invention.

Reference is therefore to be had to the appended claims for a definition of the limits of the invention.

What is claimed is:

1. In combination with a compass, a member adapted to be adjusted in accordance with the desired course, means effecting said adjustment comprising a disc turning with said member, a pinion engaging said disc, a second disc carrying said pinion, means adjusting said second disc in accordance with the desired course and fixed cam means adapted to actuate said pinion as the two discs are turned so as to vary the relative rotation of the two discs in accordance with the known deviations of said compass, said adjusting means including differential mechanism adapted to adjust the position of said second disc to compensate for the variation of said compass.

2. In combination with a compass, a member adapted to be adjusted in accordance with the desired course, means effecting said adjustment comprising a disc turning the said member, a pinion engaging said disc, a second disc carrying said pinion, means adjusting said second disc in accordance with the desired course, a stationary cam having a contour corresponding to the deviation of said compass at the different angular positions thereof, and means controlled by said cam to actuate said pinion so as to vary the relative rotation of said first and second discs as the two are rotated to correct for such deviation of said compass.

FRIEDRICH LAUCK.